United States Patent
Nie

(10) Patent No.: US 11,210,817 B2
(45) Date of Patent: Dec. 28, 2021

(54) SYSTEMS AND METHODS FOR DISPLAYING VEHICLE INFORMATION FOR ON-DEMAND SERVICES

(71) Applicant: BEIJING DIDI INFINITY TECHNOLOGY AND DEVELOPMENT CO., LTD., Beijing (CN)

(72) Inventor: Fenglong Nie, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 15/876,092

(22) Filed: Jan. 19, 2018

(65) Prior Publication Data

US 2018/0174332 A1 Jun. 21, 2018

Related U.S. Application Data

(63) Continuation of application No. PCT/CN2017/082511, filed on Apr. 28, 2017.

(30) Foreign Application Priority Data

Dec. 21, 2016 (CN) .......................... 201611193696.X

(51) Int. Cl.
*G06F 3/0481* (2013.01)
*G06F 3/0346* (2013.01)
(Continued)

(52) U.S. Cl.
CPC ........ *G06T 11/001* (2013.01); *G01C 21/3438* (2013.01); *G06T 11/60* (2013.01);
(Continued)

(58) Field of Classification Search
CPC ......... G06T 11/001; G06T 11/60; G06T 7/90; G06T 2200/24; G06T 2207/10024;
(Continued)

(56) References Cited

U.S. PATENT DOCUMENTS

2004/0177109 A1   9/2004  Lee
2007/0088497 A1*  4/2007  Jung .................. G01C 21/3647
                                                              348/113
(Continued)

FOREIGN PATENT DOCUMENTS

CN      101498585 A    8/2009
CN      102665017 A    9/2012
(Continued)

OTHER PUBLICATIONS

International Search Report in PCT/CN2017/082511 dated Sep. 20, 2017, 4 pages.
(Continued)

*Primary Examiner* — Jennifer N Welch
*Assistant Examiner* — K C Chen
(74) *Attorney, Agent, or Firm* — Metis IP LLC

(57) ABSTRACT

The present disclosure relates to systems and methods for displaying vehicle information for an on-demand service. The method may include sending a request for on-demand service to a server. The method may further include obtaining information of a vehicle related to the request for on-demand service. The information of the vehicle may include color information of the vehicle. The method may further include generating, by a processor, a user interface based on the information of the vehicle. The user interface may include at least one user interface element corresponding to the color information of the vehicle.

20 Claims, 9 Drawing Sheets

(51) Int. Cl.

| | |
|---|---|
| *G06F 3/0338* | (2013.01) |
| *G06F 3/01* | (2006.01) |
| *G06T 7/50* | (2017.01) |
| *G06T 11/00* | (2006.01) |
| *G06T 11/60* | (2006.01) |
| *H04L 29/08* | (2006.01) |
| *H04W 4/44* | (2018.01) |
| *G01C 21/34* | (2006.01) |
| *G06T 7/90* | (2017.01) |
| *G06F 9/451* | (2018.01) |
| *G06F 40/221* | (2020.01) |

(52) U.S. Cl.
CPC .......... *H04L 67/16* (2013.01); *H04L 67/327* (2013.01); *H04W 4/44* (2018.02); *G06F 3/04817* (2013.01); *G06F 9/451* (2018.02); *G06F 40/221* (2020.01); *G06T 7/90* (2017.01); *G06T 2200/24* (2013.01); *G06T 2207/10024* (2013.01); *G06T 2207/30252* (2013.01)

(58) Field of Classification Search
CPC .......... G06T 2207/30252; H04W 4/44; H04L 67/16; H04L 67/327; G06F 9/451; G06F 3/04817; G06F 17/272; G06F 40/221; G01C 21/26; G01C 21/3438
See application file for complete search history.

(56) References Cited

U.S. PATENT DOCUMENTS

| | | | |
|---|---|---|---|
| 2009/0326991 A1* | 12/2009 | Wei ................ | G06Q 10/02 705/5 |
| 2010/0241528 A1* | 9/2010 | Hedges ............ | G06Q 30/0601 705/26.1 |
| 2012/0041675 A1 | 2/2012 | Juliver et al. | |
| 2013/0257631 A1* | 10/2013 | Rangarajan ........ | G08G 1/0962 340/901 |
| 2014/0039784 A1 | 2/2014 | Millspaugh | |
| 2014/0058896 A1 | 2/2014 | Jung | |
| 2015/0084755 A1* | 3/2015 | Chen ................ | G08G 1/16 340/435 |
| 2015/0246654 A1 | 9/2015 | Tadic et al. | |
| 2016/0275638 A1 | 9/2016 | Korpi et al. | |
| 2016/0277513 A1 | 9/2016 | Kim et al. | |
| 2017/0011324 A1* | 1/2017 | Truong ............. | G06Q 50/32 |

FOREIGN PATENT DOCUMENTS

| | | |
|---|---|---|
| CN | 103208181 A | 7/2013 |
| CN | 103903425 A | 7/2014 |
| CN | 103996290 A | 8/2014 |
| CN | 104620277 A | 5/2015 |
| CN | 104881993 A | 9/2015 |
| CN | 105205519 A | 12/2015 |
| CN | 105404929 A | 3/2016 |
| CN | 106097703 A | 11/2016 |
| JP | 2002099762 A | 4/2002 |
| JP | 2002340587 A | 11/2002 |
| JP | 2003317191 A | 11/2003 |
| JP | 2004199189 A | 7/2004 |
| JP | 2005141515 A | 6/2005 |
| JP | 2007128300 A | 5/2007 |
| JP | 2007129290 A | 5/2007 |
| WO | WO03040971 A1 | 5/2003 |

OTHER PUBLICATIONS

Written Opinion in PCT/CN2017/082511 dated Sep. 20, 2017, 4 pages.
Notice of Reasons for Refusal in Japanese Application No. 2018-507723 dated May 14, 2019, 5 pages.
Examination Report in Australian Application No. 2017311612 dated Sep. 23, 2019, 7 pages.
First Office Action in Chinese Application No. 201780028651.3 dated May 18, 2021, 29 pages.
"How to Use Uber? How to Use Uber for Beginners", Web page <http://www.360doc.com/content/16/0319/20/30720007_543636760.shtml>,Mar. 19, 2016.
"Uber App Now Lets You Leave a Memo on Your Trip Receipts", Web page <https://www.iclarified.com/34936/uber-app-now-lets-you-leave-a-memo-on-your-trip-receipts>, Oct. 21, 2013.
"The New Didi Version of Uber is about to be Released. Which Six Important Sectors Have Been Updated?", Web page <https://www.leiphone.com/category/industrynews/lvKrg2RWHL0yDjnf.html>, Oct. 24, 2016.
"Uber China's New APP is Officially Launched: New Vehicle Colors Provide Two Services: People+ and Uber's Choice", Web page <https://tech.qq.com/a/20161103/023176.htm>, Nov. 3, 2016.
"Uber China's New App is Online: Five Major Function Upgrades, New Vehicle Colors", Web page <https://www.sohu.com/a/118088278_161623>, Nov. 4, 2016.
"Can't Find an Appointment Car? Light Up Your Uber Exclusive Colors", Web page <https://www.cnmo.com/news/565451.html>, Dec. 16, 2016.
Notice of Rejection in Japanese Application No. 2020-042569 dated Jun. 8, 2021, 7 pages.

* cited by examiner

SYSTEMS AND METHODS FOR DISPLAYING VEHICLE INFORMATION FOR ON-DEMAND SERVICES

CROSS-REFERENCE TO RELATED APPLICATION

This application is a Continuation of International Application No. PCT/CN/2017/082511, filed on Apr. 28, 2017, which claims priority of Chinese Patent Application No. 201611193696.X, filed on Dec. 21, 2016, the contents of which are incorporated herein by reference.

TECHNICAL FIELD

The present disclosure generally relates to online on-demand services and platforms, and in particular, to systems and methods for providing and displaying vehicle information for online on-demand services and platforms based on color information of vehicles.

BACKGROUND

On-demand services, such as online ridesharing services and delivery services, have become increasingly popular because of their convenience. A service platform that provides such services may need to process a high volume of complex data and conduct a massive amount of computation to automatically process and fulfill user requests. To provide scalable and real-time services to millions of users, such a service platform may need to perform the processing and computation using pattern recognition techniques, machine learning techniques, data mining techniques, predictive analytics, user behavior analytics, cloud computing techniques, and other computational techniques.

SUMMARY

According to an aspect of the present disclosure, a system is provided. The system may include at least one storage medium and at least one processor configured to communicate with the at least one storage medium. The at least one storage medium may include a set of instructions for displaying vehicle information for an on-demand service. When the at least one processor executing the set of instructions, the at least one processor may be directed to perform one or more of the following operations. The at least one processor may send a request for on-demand service to a server. The at least one processor may obtain information of a vehicle related to the request for on-demand service. The information of the vehicle may include color information of the vehicle. The at least one processor may generate a user interface based on the information of the vehicle. The user interface may include at least one user interface element corresponding to the color information of the vehicle.

In some embodiments, the system may further include a display configured to present the user interface.

In some embodiments, the information of the vehicle may further include text information and/or logo information of the vehicle. The display may further display text information and/or logo information of the vehicle based on the color information of the vehicle.

In some embodiments, the at least one processor may be further directed to obtain descriptive information corresponding to a color of the vehicle, and to determine the color information of the vehicle based on the descriptive information.

In some embodiments, the at least one processor may be further directed to obtain image data of the vehicle, and to determine the color information of the vehicle based on the image data.

According to another aspect of the present disclosure, a non-transitory machine-readable storage medium may include instructions. When the non-transitory machine-readable storage medium accessed by at least one processor of an online on-demand service platform from a requester terminal, the instructions may cause the at least one processor to perform one or more of the following operations. The instructions may cause the at least one processor to receive a request for on-demand service. The instructions may cause the at least one processor to determine a vehicle related to the request for on-demand service. The instructions may cause the at least one processor to obtain information related to the vehicle. The information may include color information of the vehicle. The instructions may cause the at least one processor to provide the color information related to the vehicle for presentation in at least one user interface to at least one requester terminal. The instructions may cause the at least one processor to instruct the requester terminal to display at least one user interface element in the user interface based on the color information of the vehicle.

According to a further aspect of the present disclosure, a method is provided. The method may include one or more of the following operations. A request for on-demand service may be sent to a server. Information of a vehicle related to the request for on-demand service may be obtained. The information of the vehicle may include color information of the vehicle. A user interface may be generated based on the information of the vehicle by a processor. The user interface may include at least one user interface element corresponding to the color information of the vehicle. The user interface may be displayed.

According to another aspect of the present disclosure, a method is provided. The method may include one or more of the following operations. A vehicle related to a request for on-demand service may be determined. Information related to the vehicle may be obtained. The information may include color information of the vehicle. The color information related to the vehicle may be provided to a requester terminal for presentation in a user interface. The requester terminal may be instructed to display at least one user interface element in the user interface based on the color information of the vehicle.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
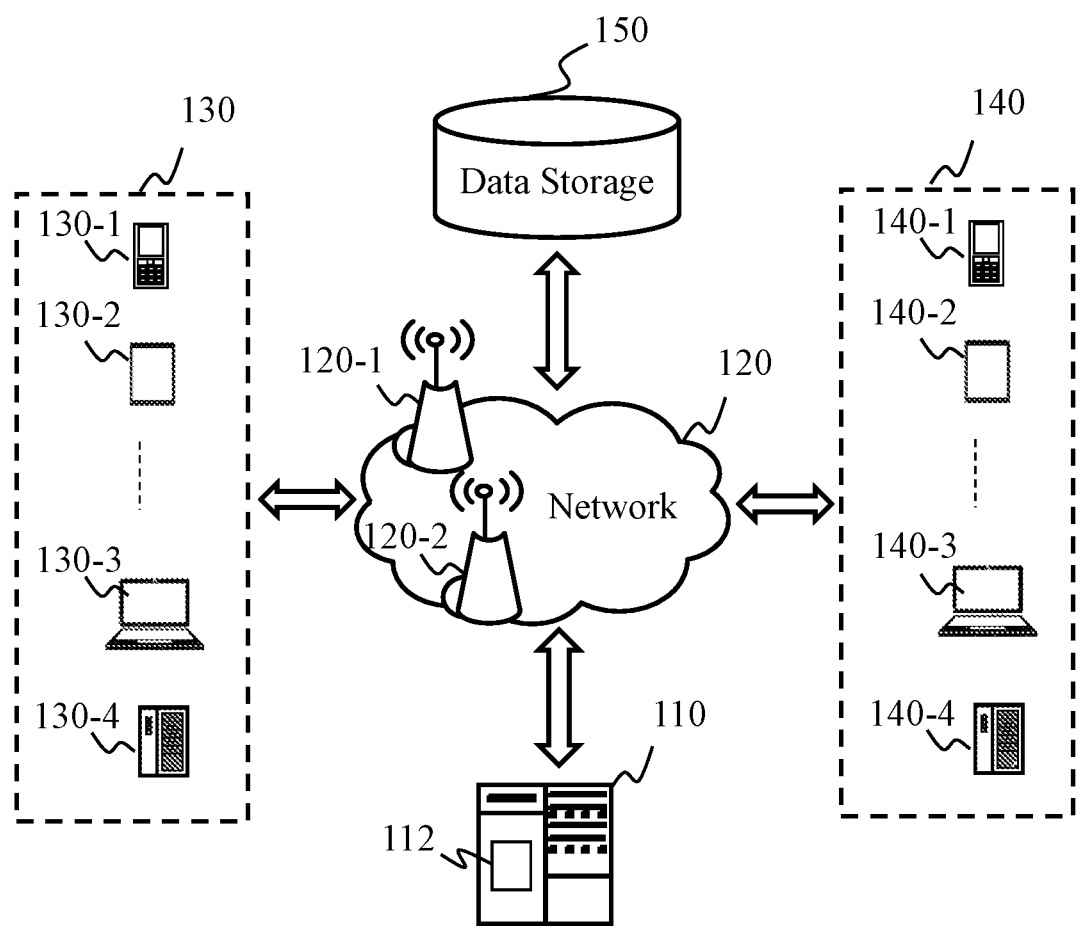
FIG. 1 is a block diagram illustrating an exemplary online on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, operations, operations, elements, and/or components, but do not preclude the presence or addition of one or more other features, integers, operations, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on-demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "requestor," "service requester," "service requestor" and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

Conventionally, a service requester of an on-demand service (e.g., a rider of a ridesharing service) may have to recognize a service provider (e.g., a driver that that accepts a ride request) based on certain information related to the service provider, such as a picture of the service provider, a license plate number of a vehicle of the service provider, etc. Such information is not visualized. As a result, it would be time-consuming for the service requester to identify the service provider based on such information. Thus, it may be desirable to provide mechanisms that enable the service requester to recognize the service provider in a more prompt and efficient manner.

Aspects of the present disclosure address the above-mentioned deficiencies by providing for mechanisms (e.g., systems, methods, and media) for displaying vehicle information for on-demand services. Upon receiving a request for a service initiated by a service requester, the mechanisms can generate color information of a vehicle to be used to provide the service (e.g., a ride, delivery). The mechanisms can then cause the color information to be presented on a user terminal (e.g., a mobile phone) associated with the service requester. For example, the mechanisms can generate one or more user interfaces including one or more user interface elements showing a color of the vehicle. More particularly, for example, an icon or any other visual representation of the vehicle can be displayed in the color of the vehicle. Additionally or alternatively, text information related to the vehicle (e.g., a description of the vehicle) can be presented in the color of the vehicle. As such, visualized information of the vehicle is presented to enable the service requester to better identify the vehicle.

It should be noted that on-demand service, such as online taxi hailing including taxi transportation services, is a new form of service rooted only in post-Internet era. It provides technical solutions to users and service providers that could raise only in post-Internet era. In pre-Internet era, for example, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service providers to respond to the service request simultaneously and in real-time. Therefore, through Internet, the online on-demand systems may provide a much more efficient transaction platform for the users and the service providers that may never met in a traditional pre-Internet transportation service system.

FIG. 1 is a block diagram of an exemplary online on-demand service system 100 according to some embodiments of the present disclosure. For example, the online on-demand service system 100 may be an online on-demand service platform for on-demand services such as taxi hailing service, goods delivery service, chauffeur service, express car service, carpool service, bus service, short-term driver-renting service, and shuttle service. The online on-demand service system 100 may be an online platform including a server 110, a network 120, a requester terminal 130, a provider terminal 140, and a data storage 150. The server 110 may include a processing engine 112.

The server 110 may be a single server, or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the data storage 150 via the network 120. As another example, the server 110 may be directly connected to the requester terminal 130, the provider terminal 140, and/or the data storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing engine 112. The processing engine 112 may process information and/or data related to the service request to perform one or more functions described in the present disclosure. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a micro-controller unit, a reduced instruction-set computer (RISC), a microprocessor, or the like, or any combination thereof.

The network 120 may facilitate exchange of information and/or data. In some embodiments, one or more components in the online on-demand service system 100 (e.g., the server 110, the requester terminal 130, the provider terminal 140, and the data storage 150) may send information and/or data to other component(s) in the online on-demand service system 100 via the network 120. For example, the server 110 may obtain/acquire service request from the requester terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online on-demand service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the requester terminal 130 and/or the provider terminal 140 may communicate with other positioning device to determine the position of the requester, the requester terminal 130, the provider, and/or the provider terminal 140. In some embodiments, the requester terminal 130 and/or the provider terminal 140 may send positioning information to the server 110.

The data storage 150 may store data and/or instructions. In some embodiments, the data storage 150 may store data obtained from the requester terminal 130 and/or the provider terminal 140. In some embodiments, the data storage 150 may store data and/or instructions that the server 110 may execute or use to perform exemplary methods described in the present disclosure. In some embodiments, data storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the data storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the data storage 150 may be connected to the network 120 to communicate with one or more components in the online on-demand service system 100 (e.g., the server 110, the requester terminal 130, the provider terminal 140, etc.). One or more components in the online on-demand service system 100 may access the data or instructions stored in the data storage 150 via the network 120. In some embodiments, the data storage 150 may be directly connected to or communicate with one or more components in the online on-demand service system 100 (e.g., the server 110, the requester terminal 130, the provider terminal 140, etc.). In some embodiments, the data storage 150 may be part of the server 110.

In some embodiments, one or more components in the online on-demand service system 100 (e.g., the server 110, the requester terminal 130, the provider terminal 140, etc.) may have a permission to access the data storage 150. In some embodiments, one or more components in the online on-demand service system 100 may read and/or modify information related to the requester, provider, and/or the public when one or more conditions are met. For example, the server 110 may read and/or modify one or more users' information after a service. As another example, the provider terminal 140 may access information related to the requester when receiving a service request from the requester terminal 130, but the provider terminal 140 may not modify the relevant information of the requester.

In some embodiments, information exchanging of one or more components in the online on-demand service system 100 may be achieved by way of requesting a service. The object of the service request may be any product. In some embodiments, the product may be a tangible product, or an intangible product. The tangible product may include food, medicine, commodity, chemical product, electrical appliance, clothing, car, housing, luxury, or the like, or any combination thereof. The intangible product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be implemented as a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2A:
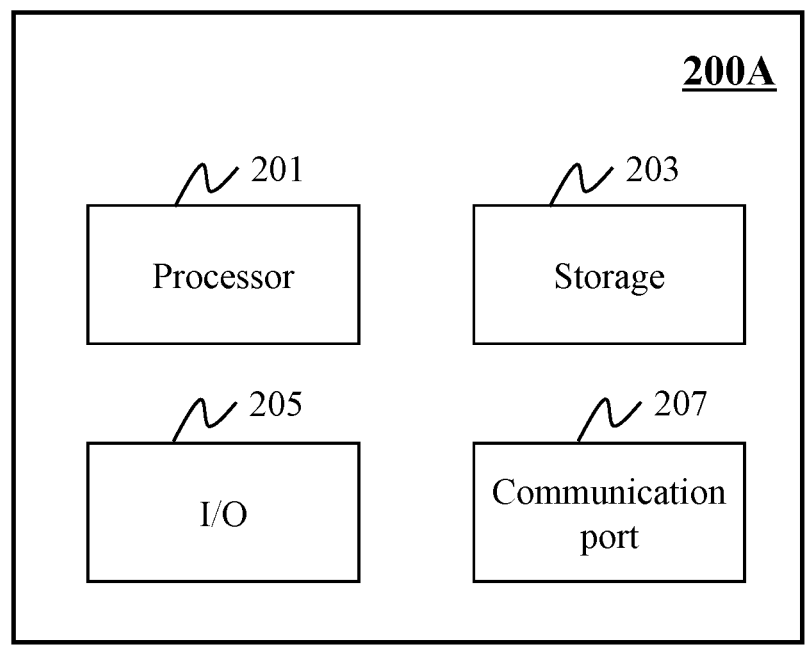
FIG. 2A is a schematic diagram illustrating exemplary hardware and/or software components of an exemplary computing device according to some embodiments of the present disclosure.

FIG. 2A is a schematic diagram illustrating exemplary hardware and/or software components of an exemplary computing device 200A on which the processing engine 112 may be implemented according to some embodiments of the present disclosure. As illustrated in FIG. 2A, the computing device 200A may include a processor 201, a storage 203, an input/output (I/O) 205, and a communication port 207.

The processor 201 may execute computer instructions (e.g., program code) and perform functions of the processing engine 112 in accordance with techniques described herein. The computer instructions may include, for example, routines, programs, objects, components, data structures, procedures, modules, and functions, which perform particular functions described herein. For example, the processor 201 may process information of a vehicle obtained from the server 110, the requester terminal 130, the provider terminal 140, the data storage 150, and/or any other component of the online on-demand service system 100. In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200A. However, it should be noted that the computing device 200A in the present disclosure may also include multiple processors, thus operations and/or method operations that are performed by one processor as described in the present disclosure may also be jointly or separately performed by the multiple processors. For example, if in the present disclosure the processor of the computing device 200A executes both operation A and operation B, it should be understood that operation A and operation B may also be performed by two or more different processors jointly or separately in the computing device 200A (e.g., a first processor executes operation A and a second processor executes operation B, or the first and second processors jointly execute operations A and B).

The storage 203 may store data/information obtained from the server 110, the requester terminal 130, the provider terminal 140, the data storage 150, and/or any other component of the online on-demand service system 100. In some embodiments, the storage 203 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for the processing engine 112 for determining a color of a vehicle based on its image.

The I/O 205 may input and/or output signals, data, information, etc. In some embodiments, the I/O 205 may enable a user interaction with the processing engine 112. In some embodiments, the I/O 205 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 120) to facilitate data communications. The communication port 207 may establish connections between the processing engine 112 and the requester terminal 130, the provider terminal 140, and/or the data storage 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port. For example, the communication port 207 may be designed in accordance with the digital imaging and communications in medicine (DICOM) protocol.

Figure 2B:
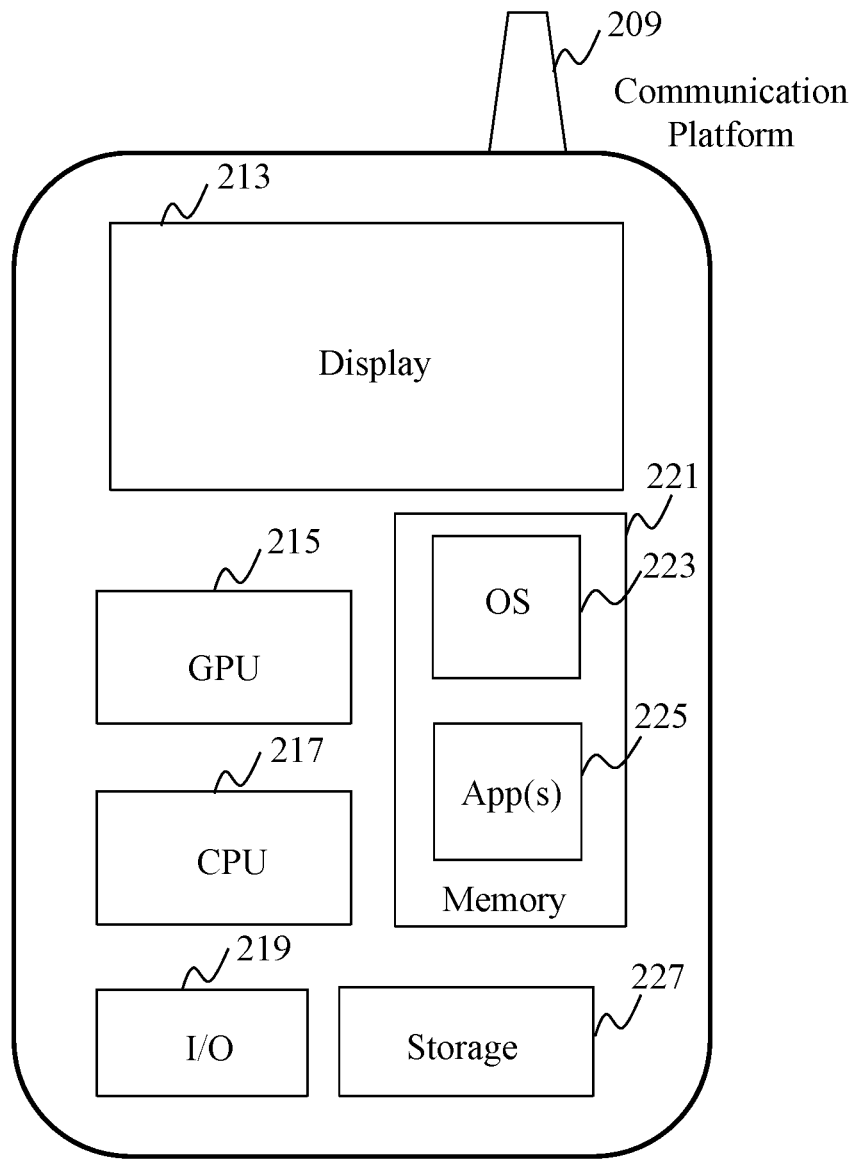
FIG. 2B is a schematic diagram illustrating exemplary hardware and/or software components of an exemplary mobile device according to some embodiments of the present disclosure.

FIG. 2B is a schematic diagram illustrating exemplary hardware and/or software components of an exemplary mobile device 200B on which the requester terminal 130 may be implemented according to some embodiments of the present disclosure. As illustrated in FIG. 2B, the mobile device 200B may include a communication platform 209, a display 213, a graphic processing unit (GPU) 215, a central processing unit (CPU) 217, an I/O 219, a memory 221, and a storage 227. In some embodiments, any other suitable component, including but not limited to a system bus or a controller (not shown), may also be included in the mobile device 200B. In some embodiments, a mobile operating system 223 (e.g., iOS™, Android™, Windows Phone™, etc.) and one or more applications 225 may be loaded into the memory 221 from the storage 227 in order to be executed by the CPU 217. The applications 225 may include a browser or any other suitable mobile apps for receiving and rendering information related to image processing or other information from the processing engine 112. User interactions with the information stream may be achieved via the I/O 219 and provided to the processing engine 112 and/or other components of the online on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 3:
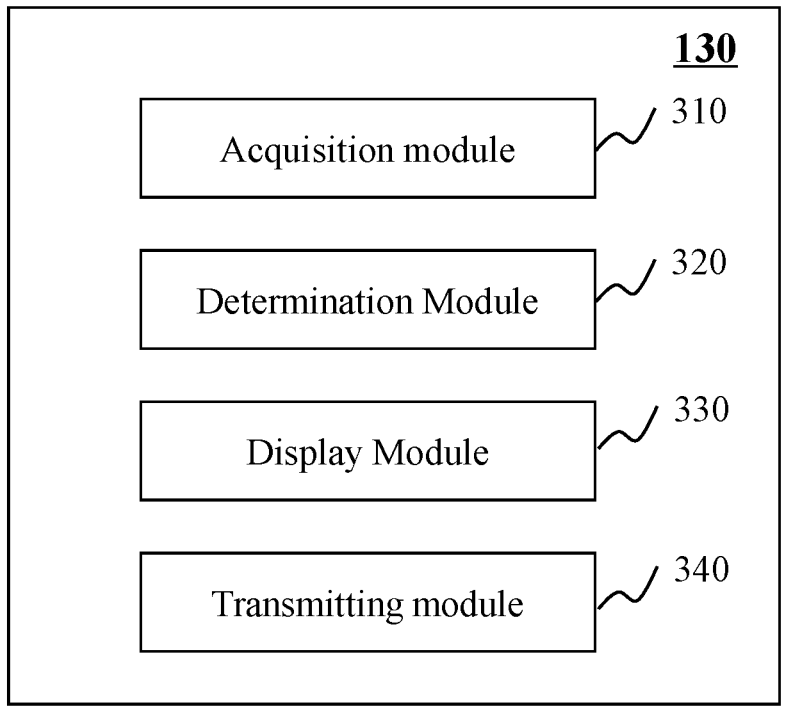
FIG. 3 is a block diagram illustrating an exemplary requester terminal according to some embodiments of the present disclosure.

FIG. 3 is a block diagram illustrating an exemplary requester terminal according to some embodiments of the present disclosure. The requester terminal 130 may include an acquisition module 310, a determination module 320, a display module 330, and a transmitting module 340. Each module may include hardware circuitry that is designed to perform the following actions, a set of instructions stored in one or more storage media, and/or any combination of the hardware circuitry and the one or more storage media.

The acquisition module 310 may acquire request and/or information related to the online on-demand service system 100. The request may be a request of an on-demand service. For example, the on-demand service may be a transportation service by a taxi, a private vehicle, a bus, a truck, and/or any other vehicle. As another example, the on-demand service may be a test drive service, a designated driving service, or the like, or any combination thereof. As still another example, the on-demand service may be an on-line delivery service, such as a meal delivery service booked on-line, a delivery service for on-line shopping, or the like, or any combination thereof. As yet another example, the on-demand service may be a service of taking an object from one place to another in a vehicle, such as a goods delivery service.

The request of the on-demand service may include a real-time request, an appointment request, or a pending request. For example, the real-time request may be a request that requires a service provider to immediately process and start the service, and/or a service of which the requester wishes to receive the service at the present moment or at a defined time reasonably close to the present moment for an ordinary person in the art. For example, a request may be a real-time request if the defined time is shorter than a threshold value, such as 1 minute, 5 minutes, 10 minutes or 20 minutes. The appointment request may refer to a request that does not require the service provider to immediately start the service and/or the requester wishes and/or expects to receive the service at a defined time which is reasonably long from the present moment for the ordinary person in the art. For example, a service request may be an appointment request if the defined time is longer than a threshold value, such as 20 minutes, 2 hours, 1 day, etc. In some embodiments, the requester terminal 130 may define the real-time request or the appointment request based on a time threshold. The time threshold may be default settings of the online on-demand service system 100, or may be adjustable depending on different situations. For example, in a traffic peak period, the time threshold may be relatively small (e.g., 10 minutes, meaning that the requested service may be delivered within 10 minutes to qualify as a real-time service), otherwise in idle period (e.g., 10:00-12:00 am), the time threshold may be relatively great (e.g., 1 hour). The pending request may be an on-going request which is in progress by a service provider at the present moment.

The request for on-demand service may include a start location (e.g., a current location of the service requester, an appointed pick-up location), a destination, a required service time, or the like, or any combination thereof. The destination may be expressly defined by the requester. Alternatively, the requester does not have to be associated with a destination.

The information related to the online on-demand service system 100 may include information of a vehicle related to the request for on-demand service. The vehicle may include a non-motor vehicle (e.g., a bicycle or a tricycle), a motor vehicle (e.g., a car or a truck), a watercraft (e.g., a ship or a boat) and/or an aircraft. In some embodiments, the vehicle may be self-driven.

The information of the vehicle may include color information, text information, logo information, image data, or the like, or any combination thereof. The color information may include any information about one or more colors of the vehicle, such as descriptive information of a color of the vehicle, a category of the color, a color code, spectral coordinate information, or the like, or any combination thereof. Descriptive information corresponding to a color may include one or more numbers, characters, symbols, and/or any other data that can be used to describe the color. The description information may include any information related to a representation of the color. For example, the descriptive information of the color can include a description of the color, such as "red," "green," or the like.

As another example, the descriptive information of the color can include one or more parameters and/or values that can be used to determine the color. In a more particular example, the descriptive information can include parsed character data corresponding to the color. The parsed character data may be in any suitable markup language, including but not limited to Extensible Markup Language (XML), HyperText Markup Language (HTML), and Standard Generalized Markup Language (SGML). In another more particular example, the descriptive information of the color may include color code information, such as a Red-Green-Blue (RGB) code, a Hue-Saturation-Value (HSV) code, an HTML color code, a Hex triplet code, or the like, or any combination thereof. Each of the color code can include one or more values defining the color and/or one or more components of the color. For example, an RGB code for "orange" may be (255, 165, 0). In still another more particular example, the descriptive information of the color can include spectral coordinate information related to the color, such as a wavelength and/or a frequency of the color. For example, the wavelength of red may vary from 635 nm to 700 nm. The frequency of red may vary from 480 THz to 430 THz.

In some embodiments, the color information of a color can include a variation of a color (e.g., "red," "orange," "grey," "blue," "yellow," "green," or the like, or any combination thereof). For example, variations of "orange" may include "orange," "sun orange," "honey orange," "tropical orange," "tangerine," or the like, or any combination thereof.

In some embodiments, one or more portions of the color information of the vehicle may be provided by a service provider associated with the vehicle. For example, the service provider may input the color of the vehicle via the provider terminal 140. In some embodiments, the server and/or the provider terminal 140 can prompt the service provider to provide color information about the vehicle when the service provider registers an account and/or the vehicle via the online on-demand service system 100 (e.g., by presenting one or more user interfaces). In some embodiments, the color information can be determined by one or more components in the online on-demand service system 100. For example, the color information may be determined by the determination module 320 and/or the determination module 420 based on image data of the vehicle (e.g., one or more images of the vehicle), registration and/or title information of the vehicle, etc.

The text information may include route information, vehicle information, diver information, or the like, or any combination thereof. The route information may include a start location, a destination, a mileage, a pickup time, an estimated fee, a unit price (e.g., a price per unit distance), a congested portion of the route (e.g., a congested road due to traffic peak), an estimated distance of between the vehicle and the service requester, an estimated arrival time of the vehicle, or the like, or any combination thereof. The vehicle information may include a license plate number of the vehicle, a color of the vehicle, a brand name of the vehicle, a number of seats in a vehicle, a trunk volume, a load capacity (e.g., a weight of products that the vehicle can carry), or the like, or any combination thereof. The service provider information may include name information (e.g., a first name, a last name, a nickname, a username), score information (e.g., a score marked by service requesters), contact information (e.g., a cell phone number, an email address), an identity code (ID), a country, a city, a gender, a date of birth, etc.

The logo information may include a brand name and/or model of vehicle, a logo image and/or a logo icon corresponding to the brand of the vehicle, or the like, or any combination thereof. Exemplary brands of the vehicle may include Benz™, Volkswagen™, Toyota™, Hyundai™, Honda™, Ford™, etc.

The determination module 320 may determine a color of a vehicle related to a request for on-demand service. For example, the determination module 320 may determine the color based on descriptive information corresponding to a color of the vehicle, an image of the vehicle, or the like, or any combination thereof. For example, the determination module 320 can determine the color by performing one or more operations described in connection with FIGS. 6 and 7.

Figure 11:
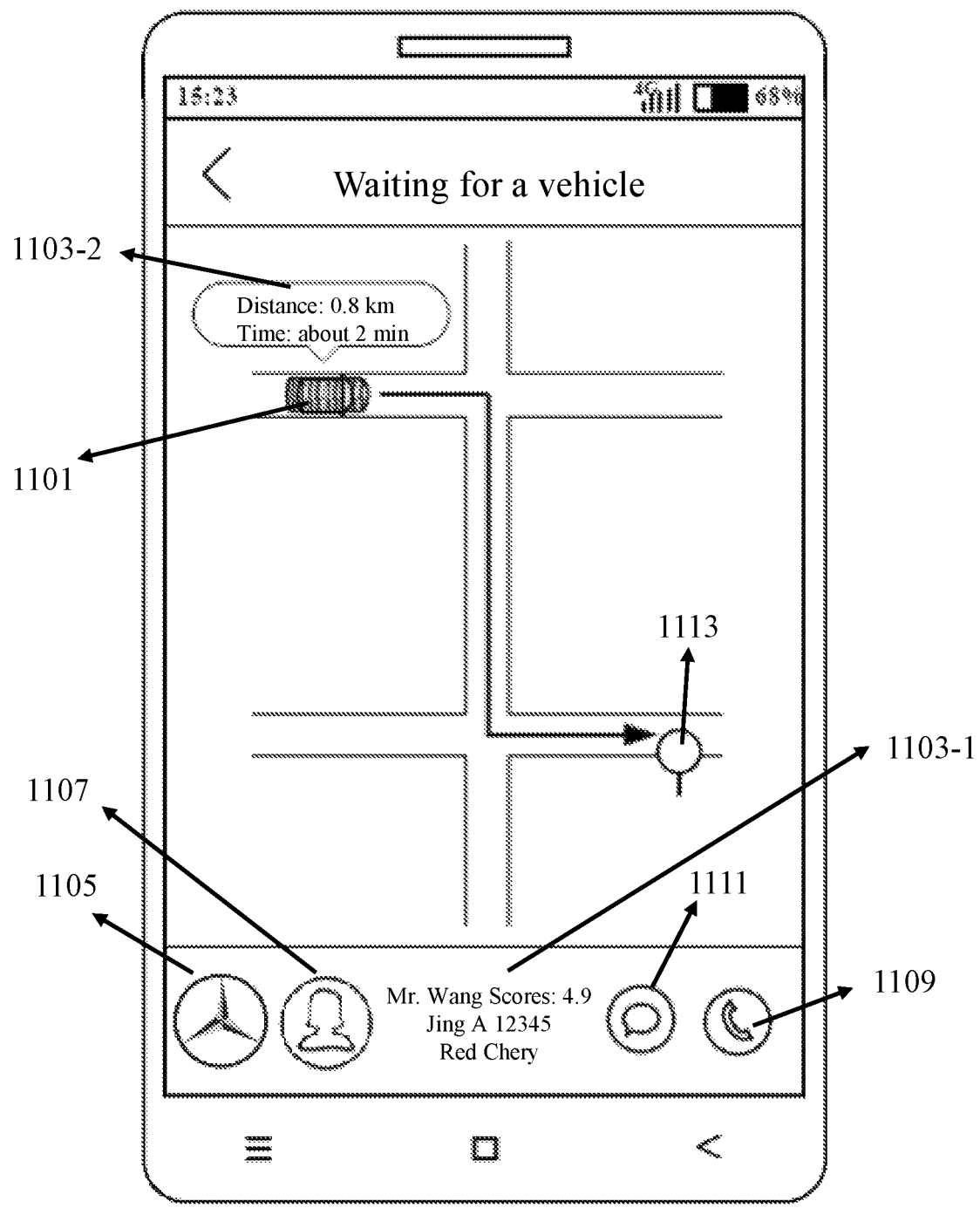
FIG. 11 illustrates an exemplary user interface for presenting vehicle information relating to an online on-demand service system according to some embodiments of the present disclosure.

The display module 330 may present one or more user interfaces related to the online on-demand service system 100. The user interfaces may include, for example, a user interface for requesting services (e.g., scheduling a ride), a user interface for presentation when a user is waiting for a ride, a user interface for presentation during a ride, etc. Each of the user interface(s) may include one or more user interface elements related to a vehicle corresponding to a request for on-demand service. Each of the user interface elements may be in any other color or a combination of any number of colors. Each of the user interface elements may have any regular shape (e.g., circular, triangular, quadrilateral, pentagon, hexagon, etc.) or any irregular shape (e.g., an element like a vehicle, etc.). Each of the user interface elements may include a graph, an icon, a text field, a button, a checkbox, an image, or the like, or any combination thereof. In some embodiments, the user interface element may include an icon of the vehicle, text information of the vehicle, and a logo of the vehicle (e.g., a logo corresponding to a brand and/or model of the vehicle). In some embodiments, the display module 330 can present a user interface 1100 as illustrated in FIG. 11.

The transmitting module 340 may transmit information and/or request to one or more components in the online on-demand service system 100. For example, the transmitting module 340 may transmit a request for on-demand service to the server 110 via the network 120. As another example, the transmitting module 340 may transmit a request to the server 110 to determine color information of a vehicle.

Figure 4:
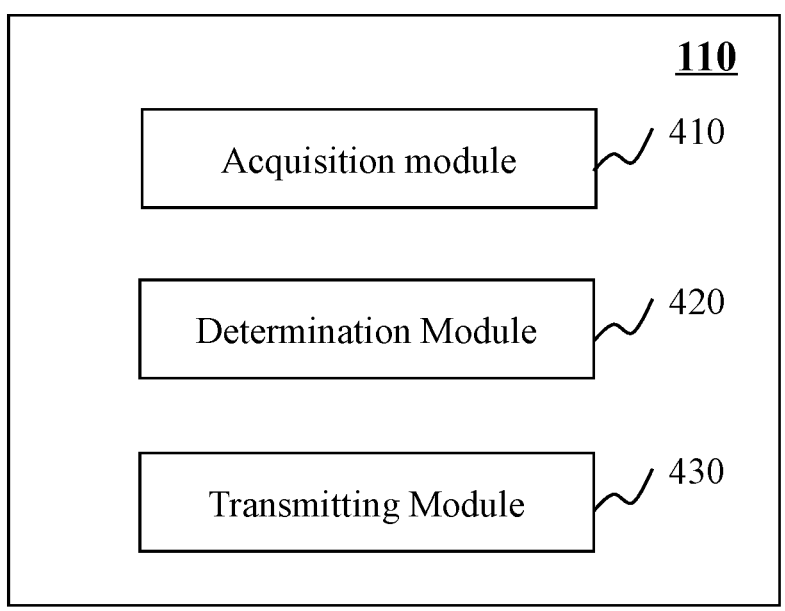
FIG. 4 is a block diagram illustrating an exemplary server according to some embodiments of the present disclosure.

FIG. 4 is a block diagram illustrating an exemplary server according to some embodiments of the present disclosure. The server 110 may include an acquisition module 410, a determination module 420, and a transmitting module 430. Each module may include hardware circuitry that is designed to perform the following actions, a set of instructions stored in one or more storage media, and/or any combination of the hardware circuitry and the one or more storage media.

The acquisition module 410 may acquire requests and/or information related to the online on-demand service system 100. The requests may include a request for an on-demand service, a request for obtaining information, a request for processing information, or the like, or any combination thereof. For example, the acquisition module 410 may receive a request for an on-demand service from a service requester via the requester terminal 130. As another example, the acquisition module 410 may obtain a request from the requester terminal 130 for obtaining information of a vehicle. As still another example, the acquisition module 410 may obtain a request from the requester terminal 130 for determining a color of a vehicle. The request and/or information related to the online on-demand service system 100 may be similar with those described in FIG. 3 and is not repeated.

The determination module 420 may determine a vehicle related to a request for on-demand service, a color of a vehicle, or the like. The vehicle related to the request for on-demand service may be determined based on distances between available vehicles and the service requester, required time for available vehicles to pick up the service requester, score information of the service providers of the available vehicles, user preference information of the service requester, or the like, or any combination thereof. The color of the vehicle may be determined based on descriptive information corresponding to a color of the vehicle, an image of the vehicle, or the like, or any combination thereof. For example, the determination module 420 can determine the color by performing one or more operations described in connection with FIGS. 9, and/or 10.

The transmitting module 430 may transmit information and/or request to other components in the online on-demand service system 100. For example, the transmitting module 430 may transmit color information of a vehicle to the requester terminal 130 via the network 120. As another example, the transmitting module 430 may transmit an instruction to the requester terminal 130 for displaying a user interface element in a user interface based on the color information of a vehicle.

In some embodiments, at least two components in the requester terminal 130 and server 110 may be connected to or communicate with each other and/or other components in the online on-demand service system 100 via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined as a single module, any one of the modules may be divided into two or more units.

In some embodiments, the requester terminal 130 and/or the server 110 may include the computing device 200A as illustrated in FIG. 2A where one or more of the components may be implemented. Merely by way of example, the acquisition module 310 and the display module 330 may be implemented on the computing device 200A that is part of the requester terminal 130, and the determination module 320 is implemented in the requester terminal 130 but not as part of computing device 200A.

It should be noted that the above descriptions of the requester terminal 130 and/or the server 110 are provided for the purposes of illustration, and not intended to limit the scope of the present disclosure. For persons having ordinary skills in the art, various modifications and changes in the forms and details of the application of the above method and system may occur without departing from the principles in the present disclosure. For example, the requester terminal 130 or the server 110 may include one or more other modules (e.g., a storage module to store data generated by the above modules). As another example, one module may perform the functions of two or more modules described above. In some embodiments, the acquisition module 310 and the transmitting module 340 may form a module to input and/or output information and request related to the online on-demand service system 100. However, those variations and modifications also fall within the scope of the present disclosure.

Figure 5:
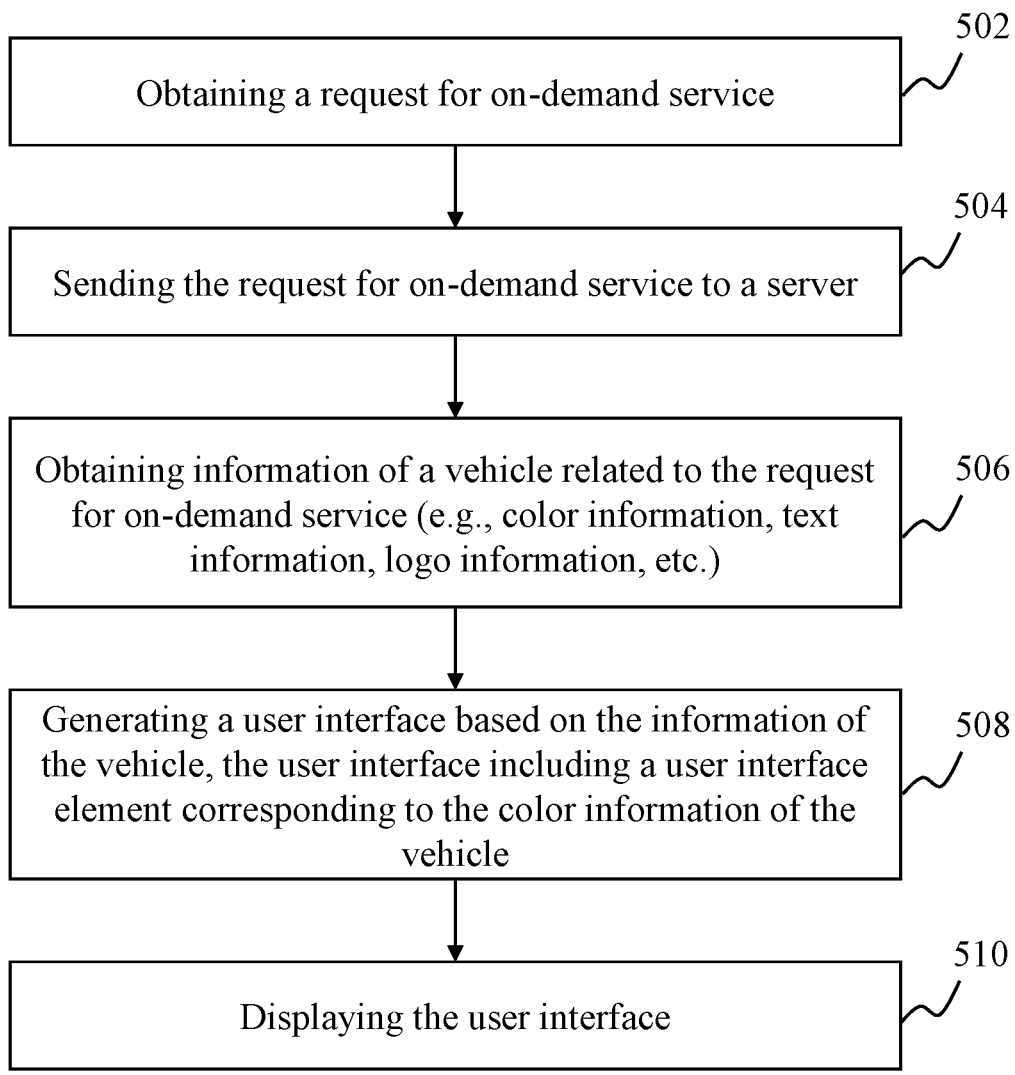
FIG. 5 is a flowchart illustrating an exemplary process for presenting information about a vehicle for an on-demand service according to some embodiments of the present disclosure.

FIG. 5 is a flowchart illustrating an exemplary process for presenting information about a vehicle for an on-demand service according to some embodiments of the present disclosure. In some embodiments, the process 500 may be executed by the online on-demand service system 100. For example, the process 500 may be implemented as a set of instructions (e.g., an application) stored in data storage 150, and/or storage 227. The requester terminal 130 and/or the CPU 217 may execute the set of instructions and may accordingly be directed to perform the process 500. The CPU 217 may be a processor of a computer server supporting an online on-demand service platform. The platform may be an Internet-based platform that connects on-demand service providers and requesters through Internet. In some embodiments, at least part of the process 500 may be performed by the computing device 200A shown in FIG. 2A.

In 502, a request for on-demand service may be obtained. The on-demand service may be a delivery service, a taxi transportation service, a test drive service, a designated driving service, or the like, or any combination thereof. The request of the on-demand service may include a real-time request, an appointment request, or a pending request, or the like. For example, a real-time request for a transportation service may be obtained in 502. For example, the request for on-demand service may include any request as described in connection with FIG. 3. In some embodiments, 502 may be performed by the acquisition module 310.

In 504, the request for on-demand service may be sent to a server. In some embodiments, the request for on-demand service may be sent to the server 110 by the transmitting module 340 via the network 120.

In 506, information of a vehicle related to the request for on-demand service may be obtained. In some embodiments, a service provider may accept the request for on-demand service via a provider terminal (e.g., the provider terminal 140-1, etc.). The provider terminal can send one or more messages indicative of acceptance of the request by the service provider. In some embodiments, the server 110 may allocate the request to a provider terminal (e.g., the provider terminal 140-2, etc.). The information of the vehicle corresponding to the provider terminal may then be sent to the requester terminal 130 via the network 120. In some embodiments, the information may be obtained by the acquisition module 310 from the data storage 150 or the server 110.

The information of the vehicle related to the request for on-demand service may include color information, text information, logo information, or the like, or any combination thereof. The color information may include descriptive information corresponding to a color of the vehicle, a category of the color, a color code, spectral coordinate information, or the like, or any combination thereof. The text information may include basic route information, vehicle information, driver information, or the like, or any combination thereof. The logo information may include a logo image and/or a logo icon corresponding to the brand of the vehicle. For example, the information of the vehicle may include any information as described in connection with FIG. 3. In some embodiments, 506 may be performed by the acquisition module 310.

In 508, the requester terminal 130 may generate a user interface based on the information of the vehicle. In some embodiments, the user interface can be generated by performing one or more operations described in connection with FIGS. 6 and 7.

The user interface may include a user interface element corresponding to the color information of the vehicle. The user interface element corresponding to the color information may have a color that is the same as or similar to the color of the vehicle. In some embodiments, a first color may be regarded as being a similar color of a second color when the first color and the second color belong to the same color category. For example, "honey orange" and "sun orange" may be similar colors because they are variations of orange. In some embodiments, the first color may be regarded as being a similar color of the second color when a similarity between the first color and the second color satisfies a particular criterion or criteria. For example, the criterion may include that the similarity is greater than a threshold. The similarity between the first color and the second color may be determined based on an RGB Euclidean Distance, an RGB vector angle, an HSV Euclidean Distance, or the like, or any combination thereof.

The user interface element corresponding to the color information may have any size, shape, and/or form. The user interface element corresponding to the color information may include an icon, a graph, text information, or the like, or any combination thereof. For example, the user interface elements may include any user interface element as described in connection with FIG. 3.

In some embodiments, user interface element corresponding to the color information may include but is not limited to a vehicle-shaped icon, text information of the vehicle, and a logo of the vehicle. The vehicle-shaped icon may have a similar shape with a vehicle. Exemplary vehicle may include but is not limited to a horse, a carriage, a rickshaw (e.g., a wheelbarrow, a bike, or a tricycle), a car (e.g., a taxi, a bus, or a private car), a train, a subway, a vessel, and an aircraft (e.g., an airplane, a helicopter, a space shuttle, a rocket, or a hot-air balloon). In some embodiments, the shape of the vehicle-shaped icon may be associated with the kind of on-demand service provided in the online on-demand service system 100. For example, as illustrated in FIG. 11, a vehicle-shaped icon 1101 associated with a car transportation service may have a similar shape with a car.

The user interface element of the text information of the vehicle may include text information of the vehicle (e.g., route information, vehicle information, diver information, etc.). For example, as shown in FIG. 11, text information elements 1103-1 and 1103-2 can include text indicative of a name of the service provider, a score of the service provider, a license plate number of the vehicle, a color of the vehicle, a brand name of the vehicle, a model of the vehicle, an estimated distance between the vehicle and the service requester, an estimated required time for the vehicle to arrive at the start location, etc. In some embodiments, the text and/or other content in the text information elements 1103-1 and 1103-2 can be presented in a color that is the same as or similar to the color of the vehicle.

The logo of the vehicle may display a logo image or a logo icon of the vehicle. The logo may correspond to a brand of the vehicle, a model of the vehicle, etc. As illustrated in FIG. 11, a logo 1105 displays a logo of Benz™ for a Benz™ vehicle. In some embodiments, the logo 1105 can be presented in a color that is the same as or similar to the color of the vehicle.

In some embodiments, the user interface element corresponding to the color information may have a same or similar color with the vehicle in the whole process of the on-demand service. For example, the vehicle-shaped icon 1101 illustrated in FIG. 11 may have a same or similar color with the vehicle from the beginning of service (e.g., when the service requester sends a request) to the ending of the service (e.g., when the vehicle arrives at the destination of the service requester). In some embodiments, the user interface element corresponding to the color information may have a same or similar color with the vehicle in at least part of the process of the on-demand service. For example, the vehicle-shaped icon 1101 may have a same color or similar color with the vehicle when the vehicle is on the way to pick up the service requester, and change to another color after picking up the service requester.

In 510, the user interface may be displayed. In some embodiments, 510 may be performed by the display module 330.

It should be noted that the above descriptions of the process 500 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, multiple user interface elements may be generated in the user interface in 508. At least one of the multiple user interface elements may correspond to the color information of the vehicle. For example, all of the multiple user interface elements may have a same or similar color with the vehicle. Alternatively, some of the multiple user interface element may have a same or similar color with the vehicle while the rest may not. However, those variations and modifications also fall within the scope of the present disclosure.

Figure 6:
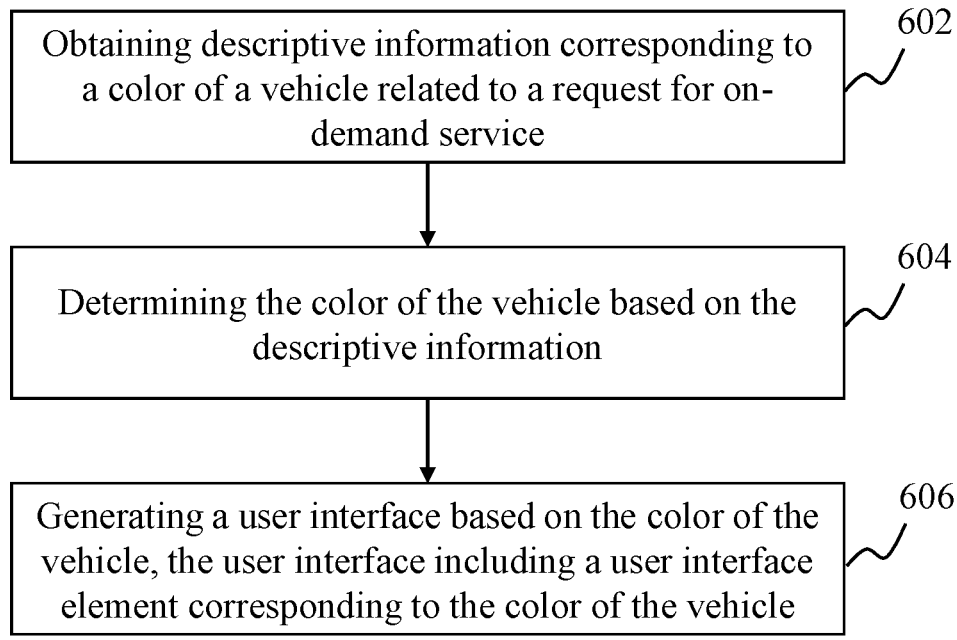
FIG. 6 is a flowchart illustrating an exemplary process for presenting information about a vehicle for on-demand service according to some embodiments of the present disclosure.

FIG. 6 is a flowchart illustrating an exemplary process for presenting information about a vehicle for an on-demand service according to some embodiments of the present disclosure. In some embodiments, at least part of the process 600 may be performed by one or more components in the requester terminal 130.

In 602, descriptive information corresponding to a color of a vehicle related to a request for on-demand service may be obtained. The descriptive information corresponding to the color of the vehicle may include a description of the color, parsed character data corresponding to the color, color code information, or the like, or any combination thereof. The descriptive information may be obtained by the acquisition module 310 from the data storage 150 and/or the server 110. For example, the descriptive information can include any descriptive information as described in connection with FIGS. 3 and 5.

In 604, the color of the vehicle may be determined based on the descriptive information. In some embodiments, the description information corresponding to the color may be transformed to parsed character data by a parsing technology. Exemplary parsing technology may include but is not limited to XML parsing technology, XHTML parsing technology, or HTML parsing technology. The color of the vehicle may then be determined based on the parsed character data. In some embodiments, 604 may be performed by the determination module 320.

In 606, a user interface may be generated based on the color of the vehicle. The user interface may include a user interface element correspond to the color of the vehicle. The user interface element corresponding to the color may have a color that is same as or similar to the color of the vehicle. The user interface element may be substantial similar to that described in 508 with reference to FIG. 5, and is not repeated here.

Figure 7:
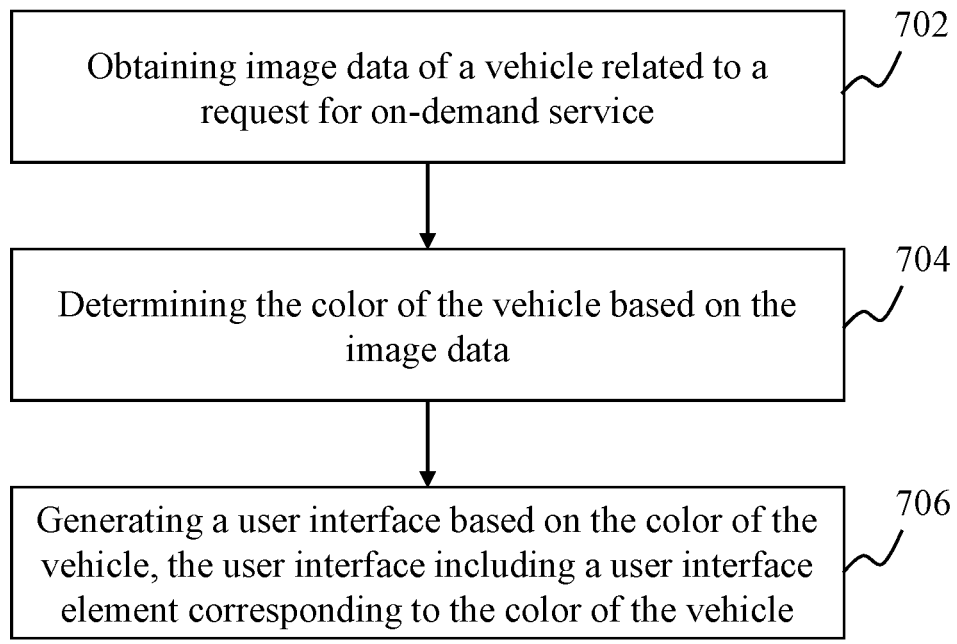
FIG. 7 is a flowchart illustrating an exemplary process for presenting information about a vehicle for on-demand service according to some embodiments of the present disclosure.

FIG. 7 is a flowchart illustrating an exemplary process for presenting information about a vehicle for an on-demand service according to some embodiments of the present disclosure. In some embodiments, at least part of the process 700 may be performed by one or more components in the requester terminal 130.

In 702, image data of a vehicle related to a request for on-demand service may be obtained. The image data can include one or more still images, moving images (a sequence of video frames), and/or any other data about one or more images. In some embodiments, the image data may be obtained by the acquisition module 310 from the data storage 150 and/or the server 110.

In 704, a color of the vehicle may be determined based on the image data. In some embodiments, the color of the vehicle may be determined by the determination module 320. In some embodiments, the determination of the color of the vehicle based on the image data may be implemented by performing one or more image processing operations. Exemplary image processing operations may include but is not limited to image segmenting, image filtering, color identifying, or the like, or any combination thereof. The image segmenting may be performed to segment a subarea from the image for color determination. The segmented subarea may be an area in the body of the vehicle. The image filtering may be performed to filter image noise, such as, a Gaussian noise, a Rayleigh noise, impulse noise, etc.

The color identifying may be performed to identify the color of the vehicle based on the image data. For example, the color of the vehicle may be determined based on a color histogram of an image of the vehicle and a plurality of color templates. The color histogram of the image may be determined based on a color code model (e.g., a RGB code model, a HSV code model, a CMYK code model, etc.). Each of the plurality of color templates may include color information of the corresponding color. The corresponding color may include common vehicle color, such as, "red," "blue," "green," "white," "black," "silver," "grey," "yellow," etc. The color of the image may be determined by comparing the color histogram of the image and the plurality of color templates. Alternatively, the color of the vehicle may be determined based on the plurality of color templates and a color matrix or a color vector of the image. The color matrix and the color vector may be determined based on a color code model.

In 706, a user interface may be generated based on the color of the vehicle. The user interface may include a user interface element corresponding to the color of the vehicle. Steps 706 and 606 may be performed in a substantially similar manner.

It should be noted that the above descriptions of the process 700 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, the color of the image may be determined based on other related technologies, such as, a machine learning technology, a neural network technology, etc.

Figure 8:
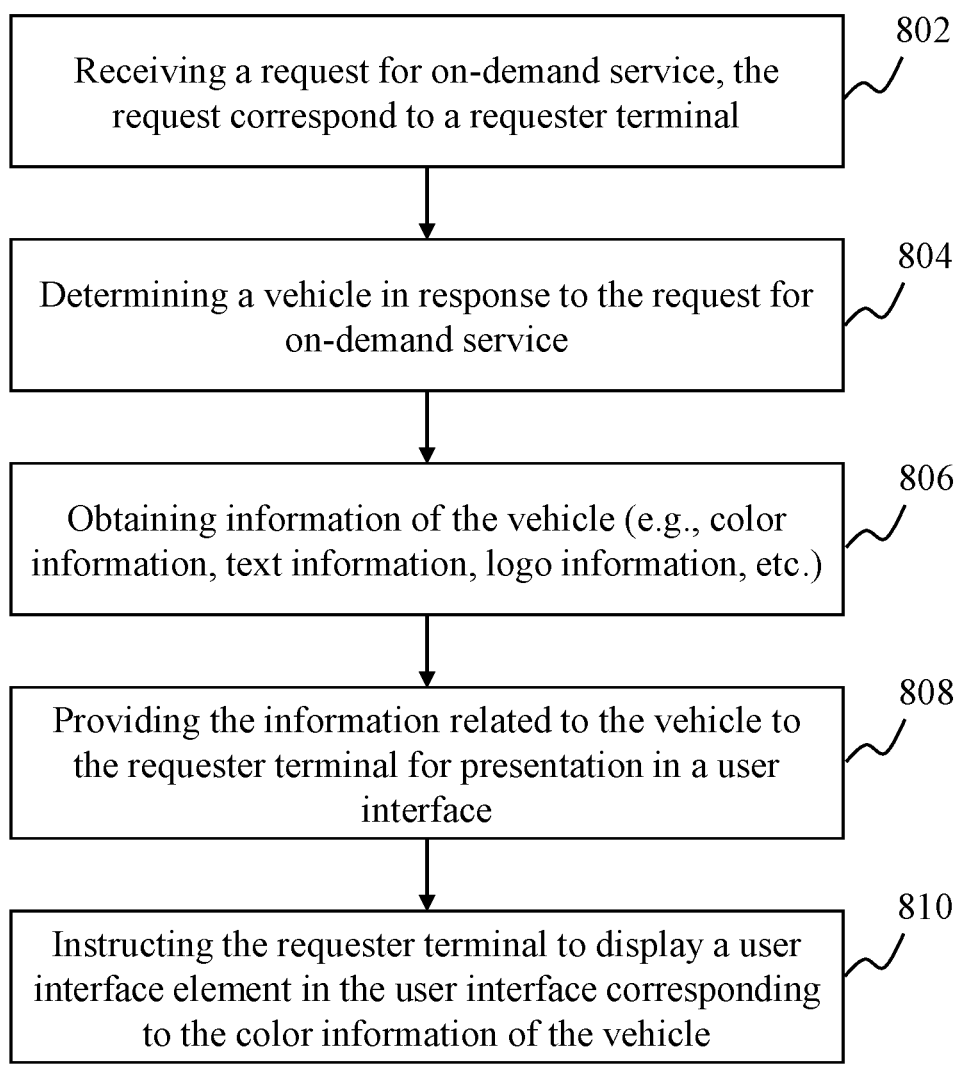
FIG. 8 is a flowchart illustrating an exemplary process for presenting information about a vehicle for on-demand service according to some embodiments of the present disclosure.

FIG. 8 is a flowchart illustrating an exemplary process for presenting information about a vehicle for an on-demand service according to some embodiments of the present disclosure. In some embodiments, the process 800 may be executed by the online on-demand service system 100. For example, the process 800 may be implemented as a set of instructions (e.g., an application) stored in data storage 150, and/or storage 227. The server 110 and/or the CPU 217 may execute the set of instructions and may accordingly be directed to perform the process and/or method 800. The CPU 217 may be a processor of a computer server supporting an online on-demand service platform. The platform may be an Internet-based platform that connects on-demand service providers and requesters through Internet. In some embodiments, at least part of the process 800 may be performed by the computing device 200A shown in FIG. 2A.

In 802, a request for on-demand service may be received. The request may correspond to a requester terminal. The request for on-demand service may include a start location (e.g., current location of the service requester, an appointed pick-up location), a destination, a required service time, or the like, or any combination thereof. For example, the request may be any request as described in connection with FIGS. 3 and 5. In some embodiments, 802 may be performed by the acquisition module 410.

In 804, a vehicle may be determined related to the request for on-demand service. In some embodiments, available vehicles may be determined and the vehicle may be selected from the available vehicles. The available vehicles may be vehicles which are not providing service for other service requesters in the required service time. The available vehicles may be ranked based on one or more ranking criteria, such as, distances between the available vehicles to the start location, required driving time to arrive at the start location, score information of the service providers, user preference information of the service requester, or the like, or any combination thereof. The vehicle in response to the request for on-demand service may be determined based on the ranking result. For example, a vehicle with smallest distance to the start location may be selected.

In 806, information of the vehicle may be obtained. The information of the vehicle may include color information, text information, logo information, or the like, or any combination thereof. In some embodiments, the information may be obtained by the acquisition module 410 from the data storage 150. For example, the information of the vehicle may include any information as described in connection with FIG. 3 and the relevant descriptions.

In 808, the information related to the vehicle may be sent to the requester terminal for presentation in a user interface. In some embodiments, 808 may be performed by the transmitting module 430.

In 810, an instruction may be sent to the requester terminal to display a user interface element corresponding to the color information of the vehicle in the user interface. Referring back to FIG. 5, the user interface element corresponding to the color information of the vehicle may have a same or a similar color with the vehicle. The user interface element corresponding to the color information of the vehicle may have any shape, size, or form. In some embodiments, the user interface element corresponding to the color information of the vehicle may include but is not limited to a vehicle-shaped icon, text information of the vehicle, or a logo of the vehicle. For example, the user interface element corresponding to the color information of the vehicle may be described in connection with FIG. 5. In some embodiments, 810 may be performed by the transmitting module 430.

It should be noted that the above descriptions of the process 800 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, the requester terminal may be instructed to display multiple user interface elements in 810. At least one of the multiple user interface elements may correspond to the color information of the vehicle. However, those variations and modifications also fall within the scope of the present disclosure.

Figure 9:
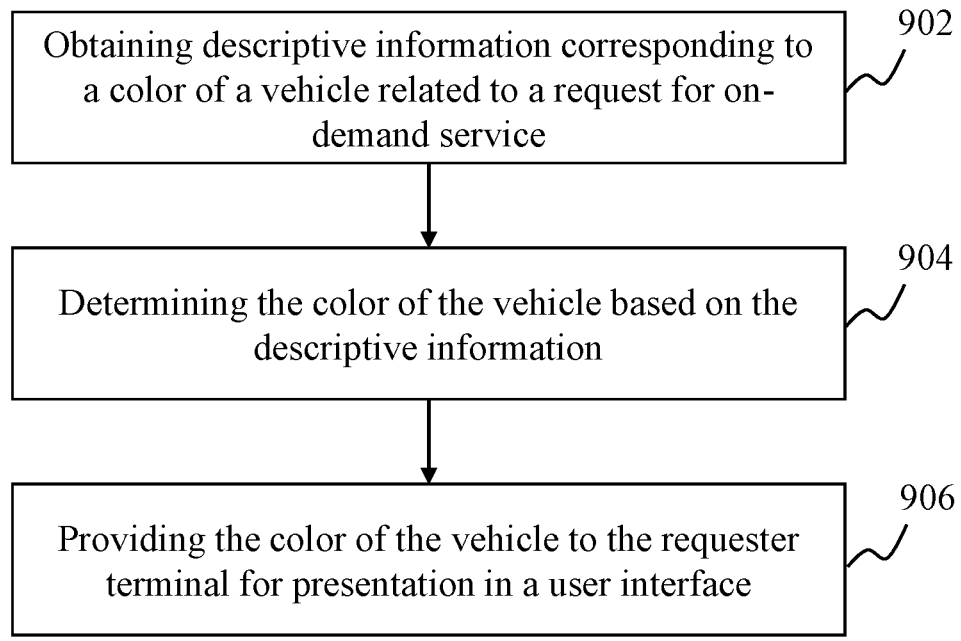
FIG. 9 is a flowchart illustrating an exemplary process for presenting vehicle information for an on-demand service according to one embodiment of the present disclosure.

FIG. 9 is a flowchart illustrating an exemplary process for presenting vehicle information for an on-demand service according to one embodiment of the present disclosure. In some embodiments, at least part of the process 900 may be performed by one or more components in the server 110.

In 902, descriptive information corresponding to a color of a vehicle related to a request for on-demand service may be obtained. In some embodiments, the descriptive information may be obtained by the acquisition module 410 from the data storage 150. Steps 902 and 602 may be performed in a substantially similar manner.

In 904, the color of the vehicle may be determined based on the descriptive information. In some embodiments, 904 may be performed by the determination module 420. Steps 904 and 604 may be performed in a substantially similar manner.

In 906, the color of the vehicle may be provided to the requester terminal for presentation in a user interface. In some embodiments, 906 may be performed by the transmitting module 430.

Figure 10:
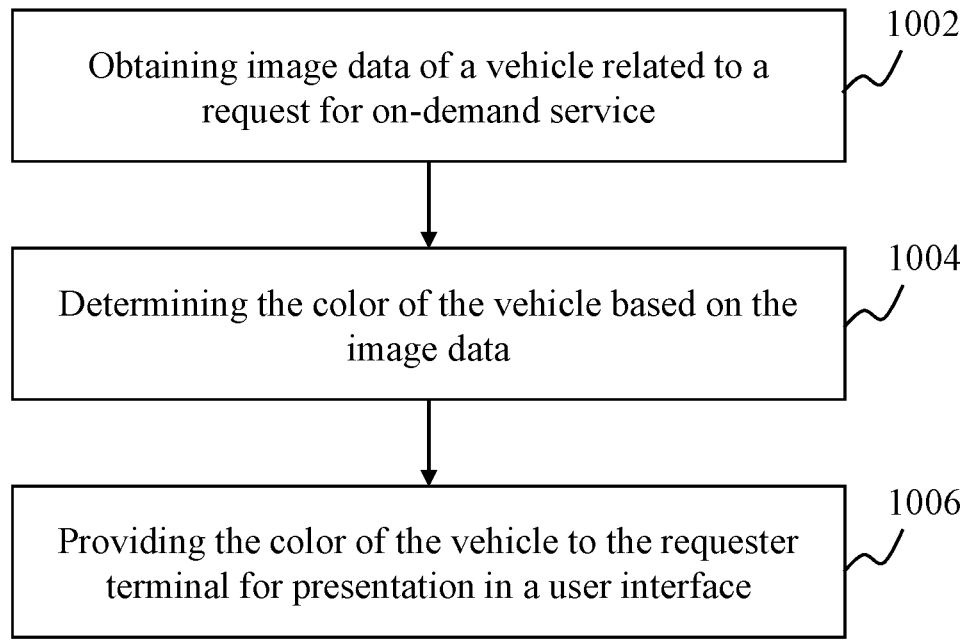
FIG. 10 is a flowchart illustrating an exemplary process for presenting vehicle information for an on-demand service according to another embodiment of the present disclosure.

FIG. 10 is a flowchart illustrating an exemplary process for presenting vehicle information for an on-demand service according to another embodiment of the present disclosure. In some embodiments, at least part of the process 1000 may be performed by one or more components in the server 110.

In 1002, image data of a vehicle related to a request for on-demand service may be obtained. In some embodiments, 1002 may be performed by the acquisition module 410.

In 1004, the color of the vehicle may be determined based on the image data. In some embodiments, 1004 may be performed by the determination module 420. Steps 1004 and 704 may be performed in a substantially similar manner.

In 1006, a user interface may be generated based on the color of the vehicle. The user interface may include a user interface element corresponding to the color of the vehicle. Steps 1006 and 606 may be performed in a substantially similar manner.

FIG. 11 illustrates an exemplary user interface for presenting vehicle information relating to an online on-demand service system according to some embodiments of the present disclosure. As shown in FIG. 11, the user interface 1100 may include a map, a vehicle-shaped icon 1101, text information elements 1103-1 and 1103-2, a logo 1105, an image of a service provider 1107, a phone icon 1109 to call the service provider, a message icon 1111 to chat with the service provider, a location icon 1113 (e.g., a pickup point, a destination, etc.), or other user interface elements related to the online on-demand service system 100. At least one of the user interface elements in user interface 1100 may have a color that is same as or similar to the color of the vehicle. For example, the vehicle-shaped icon 1101 may be red if the vehicle is red. It should be noted that the user interface 1100 is provided for the purposes of illustration, and not intended to limit the scope of the present disclosure. The user interface may have any number of user interface elements and the user interface elements may be configured in any size, form, shape, and arrangement.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system, comprising:
   a bus;
   a color determination module;
   at least one storage medium electronically connected to the bus, including a set of instructions for displaying vehicle information for an on-demand service; and
   logic circuits configured to communicate with the at least one storage media via the bus,
   wherein when executing the set of instructions, the logic circuits are directed to:
   receive a request for an on-demand service from a user terminal operated by a user, the request comprising a start location;
   assign a vehicle that matches the request for the on-demand service based on user preference information of the user and distances between available vehicles to the start location, required driving time of the available vehicles to arrive at the start location, score information of service providers driving the available vehicles, or combination thereof, the vehicle having a designated provider terminal;
   obtain information of the vehicle comprising color information of the vehicle, wherein the color information of the vehicle comprising descriptive information of the vehicle, image data of the vehicle, text data of the vehicle, or a combination thereof;
   use the color determination module to determine a display color for the vehicle based on the information of the vehicle comprising color information of the vehicle; and
   generate a user interface on the user terminal to display a colored vehicle-shaped icon in the determined display color of the vehicle, based on establishing communications between the user terminal and a provider terminal of the assigned vehicle,
   wherein the color determination module is capable of determining the display color of the vehicle based on any combination of at least two or more of the descriptive information of the vehicle, the image data of the vehicle, or the text data of the vehicle.

2. The system of claim 1, further comprising a display configured to present the user interface.

3. The system of claim 1, wherein the information of the vehicle comprises text information of the vehicle and the logic circuits are further directed to:
   display the text information of the vehicle in the determined color of the vehicle.

4. The system of claim 1, wherein the information of the vehicle comprises logo information of the vehicle and the logic circuits are further directed to:
   display the graphic logo in the user interface.

5. The system of claim 1, wherein to obtain the color information of the vehicle, the logic circuits are further directed to:
   obtain electronic signals including descriptive information corresponding to a color of the vehicle; and
   use the color determination module to determine the color information of the vehicle based on the descriptive information.

6. The system of claim 5, wherein to determine the color information of the vehicle based on the descriptive information, the logic circuits are further directed to:
   parse the descriptive information corresponding to the color of the vehicle.

7. The system of claim 1, wherein to obtain the color information of the vehicle, the logic circuits are further directed to:
   obtain electronic signals including image data of the vehicle; and
   use the color determination module to determine the color information of the vehicle based on the image data.

8. The system of claim 7, wherein the image data of the vehicle is a picture of the vehicle.

9. A non-transitory machine-readable storage medium including instructions that, when accessed by logic circuits of an online on-demand service platform from a user terminal, instructs the logic circuits to:
   receive a request for an on-demand service from a user terminal operated by a user, the request comprising a start location;
   assign a vehicle that matches the request for the on-demand service based on user preference information of the user and distances between available vehicles to the start location, required driving time of the available vehicles to arrive at the start location, score information of service providers driving the available vehicles, or combination thereof, the vehicle having a designated provider terminal;
   obtain information related to the vehicle, comprising color information of the vehicle, wherein the color information of the vehicle comprising descriptive information of the vehicle, image data of the vehicle, text data of the vehicle, or a combination thereof;
   use a color determination module to determine a display color for the vehicle based on the information of the vehicle comprising color information of the vehicle; and
   generate a user interface on the user terminal to display a colored vehicle-shaped icon in the determined display color of the vehicle, based on establishing communications between the user terminal and a provider terminal of the assigned vehicle,
   wherein the color determination module is capable of determining the display color of the vehicle based on any combination of at least two or more of the descriptive information of the vehicle, the image data of the vehicle, or the text data of the vehicle.

10. The non-transitory machine-readable storage medium of claim 9, wherein to obtain the color information of the vehicle, the logic circuits are further instructed to:
    obtain electronic signals including descriptive information corresponding to a color of the vehicle; and
    use the color determination module to determine the color information of the vehicle based on the descriptive information.

11. The non-transitory machine-readable storage medium of claim 10, wherein to obtain the descriptive information corresponding to the color of the vehicle, the logic circuits are further instructed to:
    parse the descriptive information corresponding to the color of the vehicle.

12. The non-transitory machine-readable storage medium of claim 9, wherein to obtain the color information of the vehicle, the logic circuits are further instructed to:
    obtain electronic signals including image data of the vehicle; and
    use the color determination module to determine the color information of the vehicle based on the image data.

13. The non-transitory machine-readable storage medium of claim 9, wherein the information of the vehicle comprises text information of the vehicle and the storage medium further instructs the logic circuits to:
  instruct the requester terminal to display text information of the vehicle in the determined color of the vehicle.

14. The non-transitory machine-readable storage medium of claim 9, wherein the information of the vehicle comprises logo information of the vehicle and the storage medium further instructs the logic circuits:
  instruct the requester terminal to display the graphic logo.

15. A method configured to display vehicle information for an on-demand service using a system, the system comprising a bus; a color determination module; at least one storage medium electronically connected to the bus, including a set of instructions for displaying vehicle information for an on-demand service; and logic circuits configured to communicate with the at least one storage media via the bus, using the system, the method comprising:
  receiving a request for an on-demand service from a user terminal operated by a user, the request comprising a start location;
  assigning a vehicle that matches the request for the on-demand based on user preference information of the user and distances between available vehicles to the start location, required driving time of the available vehicles to arrive at the start location, score information of service providers driving the available vehicles, or combination thereof, the vehicle having a designated provider terminal;
  obtaining information of the vehicle comprising color information of the vehicle, wherein the color information of the vehicle comprising descriptive information of the vehicle, image data of the vehicle, text data of the vehicle, or a combination thereof;
  using the color determination module to display color of the vehicle based on the information of the vehicle; and
  generating a user interface on the user terminal to display a colored vehicle-shaped icon in the determined display color of the vehicle, based on establishing communications between the user terminal and a provider terminal of the assigned vehicle,
  wherein the color determination module is capable of determining the display color of the vehicle based on any combination of at least two or more of the descriptive information of the vehicle, the image data of the vehicle, or the text data of the vehicle.

16. The method of claim 15, wherein the information of the vehicle comprises text information of the vehicle and the method further comprising:
  displaying text information of the vehicle in the determined color of the vehicle.

17. The method of claim 15, wherein the information of the vehicle comprises logo information of the vehicle and the method further comprising:
  displaying the graphic logo in the user interface.

18. The method of claim 15, wherein obtaining the color information of the vehicle comprises:
  obtaining electronic signals including descriptive information corresponding to a color of the vehicle; and
  using the color determination module to the color information of the vehicle based on the descriptive information.

19. The method of claim 18, wherein obtaining the descriptive information corresponding to the color of the vehicle comprises:
  parsing the descriptive information corresponding to the color of the vehicle.

20. The method of claim 15, wherein obtaining the color information of the vehicle comprises:
  obtaining image data of the vehicle; and
  using the color determination module to the color information of the vehicle based on the image data.

* * * * *